(12) United States Patent
Sharma et al.

(10) Patent No.: US 8,010,402 B1
(45) Date of Patent: Aug. 30, 2011

(54) METHOD FOR AUGMENTING TRANSACTION DATA WITH VISUALLY EXTRACTED DEMOGRAPHICS OF PEOPLE USING COMPUTER VISION

(75) Inventors: Rajeev Sharma, State College, PA (US); Hankyu Moon, State College, PA (US); Varij Saurabh, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 0 days.

(21) Appl. No.: 12/386,654

(22) Filed: Apr. 21, 2009

Related U.S. Application Data

(63) Continuation-in-part of application No. 10/452,972, filed on Jun. 3, 2003, now abandoned.

(60) Provisional application No. 60/402,817, filed on Aug. 12, 2002.

(51) Int. Cl.
*G06Q 10/00* (2006.01)
*G06Q 30/00* (2006.01)
*G06Q 90/00* (2006.01)

(52) U.S. Cl. ............... 705/7.29; 705/14.49; 705/500

(58) Field of Classification Search .......... 705/7.29, 705/14.49, 500
See application file for complete search history.

(56) References Cited

U.S. PATENT DOCUMENTS

| | | | | |
|---|---|---|---|---|
| 5,331,544 A * | 7/1994 | Lu et al. | ........................... | 705/10 |
| 5,369,571 A | 11/1994 | Metts | | |
| 5,550,928 A * | 8/1996 | Lu et al. | ........................ | 382/116 |
| 5,781,650 A | 7/1998 | Lobo et al. | | |
| 5,974,396 A | 10/1999 | Anderson et al. | | |
| 5,983,069 A | 11/1999 | Cho et al. | | |
| 6,070,147 A | 5/2000 | Harms et al. | | |
| 6,129,274 A | 10/2000 | Suzuki | | |
| 6,188,777 B1 | 2/2001 | Darrell et al. | | |
| 6,285,983 B1 | 9/2001 | Jenkins | | |
| 6,298,348 B1 | 10/2001 | Eldering | | |
| 6,338,044 B1 | 1/2002 | Cook et al. | | |
| 6,393,471 B1 | 5/2002 | Kobata | | |
| 6,408,278 B1 | 6/2002 | Carney et al. | | |

(Continued)

OTHER PUBLICATIONS

Ismail Haritaoglu, David Harwood, Larry S. Davis, "Hydra: Multiple People Detection and Tracking Using Silhouettes," vs, pp. 6, Second IEEE Workshop on Visual Surveillance, 1999.*

(Continued)

*Primary Examiner* — Beth V Boswell
*Assistant Examiner* — Folashade Anderson

(57) ABSTRACT

The present invention is a system and framework for augmenting any retail transaction system with information about the involved customers. This invention provides a method to combine the transaction data records and a customer or a group of customers with the automatically extracted demographic features (e.g., gender, age, and ethnicity), shopping group information, and behavioral information using computer vision algorithms. First, the system detects faces from face view, tracks them individually, and estimates poses of each of the tracked faces to normalize. These facial images are processed by the demographics classification module to determine and record the demographics feature vector. The system detects and tracks customers to analyze the dynamic behavior of the tracked customers so that their shopping group membership and checkout behavior can be recognized. Then the instances of faces and the instances of bodies can be matched and combined. Finally, the transaction data from the transaction data and the demographics, group, and checkout behavior data that belong to the same person or the same group of people are combined.

18 Claims, 15 Drawing Sheets

U.S. PATENT DOCUMENTS

| | | | |
|---|---|---|---|
| 6,408,279 B1 * | 6/2002 | Mason | 705/16 |
| 6,424,949 B1 | 7/2002 | Deaton et al. | |
| 6,430,539 B1 | 8/2002 | Lazarus et al. | |
| 6,873,710 B1 * | 3/2005 | Cohen-Solal et al. | 382/100 |
| 6,970,810 B1 * | 11/2005 | Matsko | 702/187 |
| 7,043,056 B2 * | 5/2006 | Edwards et al. | 382/103 |
| 7,453,347 B1 * | 11/2008 | Bogat | 340/10.1 |
| 2001/0004733 A1 | 6/2001 | Eldering | |
| 2002/0035560 A1 | 3/2002 | Sone | |
| 2002/0052881 A1 | 5/2002 | Player | |
| 2002/0076100 A1 | 6/2002 | Luo | |
| 2004/0111454 A1 * | 6/2004 | Sorensen | 708/200 |
| 2010/0153180 A1 * | 6/2010 | Angell et al. | 705/10 |

OTHER PUBLICATIONS

S. S Baker and T. Kanade "Hallucinating Faces" 4$^{th}$ International Conference on Automatic Face and Gesture Recognition (Mar. 2000).*

Sorensen H. The Science of Shopping. Marketing Research [serial online]. Fall2003 2003;15(3):30-35. Available from: Business Source Complete, Ipswich, MA. Accessed Jun. 7, 2011.*

Ali, Mohammad Ahsan (2006). Feature-based tracking of multiple people for intelligent video surveillance. M.Sc. dissertation, University of Windsor (Canada), Canada. Retrieved Jun. 7, 2011, from Dissertations & Theses: Full Text.(Publication No. AAT MR17022).*

Ali, M. A., Indupalli, S. Boufama, B. (unknown). Tracking Multiple People for Video Surveillance. University of Windsor (Canada), Canada.*

I. Haritaoglu, et al., "Detection and Tracking of Shopping Groups in Stores," IEEE Computer Society Conf. on CVPR, vol. 1, pp. I-431-I-438, 2001.

I. Haritaoglu, et al., "Attentive Billboards," 11th International Conf. on Image Analysis and Processing (ICIAP'01), pp. 162-167, 2001.

M. J. Lyons, et al., "Automatic Classification of Single Facial Images," IEEE Transactions on Pattern Analysis and Machine Intelligence, vol. 21, No. 12, pp. 1357-1362, 1999.

B. Moghaddam, et al., "Gender Classification with Support Vector Machines," Proc. of International Conf. on Automatic Face and Gesture Recognition, 2000.

* cited by examiner

DATE, TIME, AND LANE NUMBER PROVIDE THE INFORMATION TO LINK A TRANSACTION WITH THE CORRESPONDING SHOPPER DATA INCLUDING DEMOGRAPHIC AND BEHAVIOR TYPE

| DATE | TIME | STORE | LN | CASH-IER | MEMBER ID | QTY & WEIGHT | COST | DISC. | MAR. | DEPT. | ITEM UPC |
|---|---|---|---|---|---|---|---|---|---|---|---|
| 11/3/2006 | 9:00:07 AM | 5 | 11 | 205 | 48001392661 | 1 | 0.49 | 1.07 | 0.00 | 0.51 | 5 | 000203002000000 |
| 11/3/2006 | 9:00:08 AM | 5 | 11 | 205 | 48001392661 | 1 | 0.75 | 1.64 | 0.00 | 0.78 | 5 | 000203002000000 |
| 11/3/2006 | 9:00:10 AM | 5 | 11 | 205 | 48001392661 | 1 | 3.12 | 6.21 | 0.00 | 2.81 | 5 | 000203530000000 |
| 11/3/2006 | 9:00:12 AM | 5 | 11 | 205 | 48001392661 | 1 | 0.00 | 0.99 | 0.10 | 0.28 | 1 | 000074931111005 |
| 11/3/2006 | 9:00:12 AM | 5 | 11 | 205 | 48001392661 | 1 | 0.73 | 0.65 | 0.00 | 0.30 | 4 | 000000000004074 |
| 11/3/2006 | 9:00:14 AM | 5 | 11 | 205 | 48001392661 | 1 | 0.00 | 1.29 | 0.40 | 0.66 | 11 | 000688267006810 |
| 11/3/2006 | 9:00:15 AM | 5 | 11 | 205 | 48001392661 | 1 | 0.00 | 1.29 | 0.40 | 0.66 | 11 | 000688267006810 |
| 11/3/2006 | 9:00:16 AM | 5 | 11 | 205 | 48001392661 | 1 | 0.00 | 1.03 | 0.05 | 0.34 | 13 | 000029000000726 |
| 11/3/2006 | 9:00:17 AM | 5 | 11 | 205 | 48001392661 | 1 | 0.00 | 1.03 | 0.05 | 0.34 | 13 | 000029000000726 |
| 11/3/2006 | 9:00:18 AM | 5 | 11 | 205 | 48001392661 | 1 | 0.00 | 3.49 | 0.25 | 1.12 | 11 | 000072180633980 |
| 11/3/2006 | 9:00:20 AM | 5 | 11 | 205 | 48001392661 | 4 | 0.00 | -0.12 | 0.00 | 0.00 | 90 | 000000000009872 |
| 11/3/2006 | 9:00:21 AM | 5 | 11 | 205 | 48001392661 | 1 | 0.51 | 2.03 | 0.25 | 1.52 | 27 | 000000000004469 |
| 11/3/2006 | 9:00:32 AM | 5 | 11 | 205 | 48001392661 | 1 | 0.00 | 0.49 | 0.05 | 0.16 | 1 | 000688267034500 |

Fig. 14

METHOD FOR AUGMENTING TRANSACTION DATA WITH VISUALLY EXTRACTED DEMOGRAPHICS OF PEOPLE USING COMPUTER VISION

CROSS-REFERENCE TO RELATED APPLICATIONS

This patent application is a continuation in part of U.S. patent application Ser. No. 10/452,972, filed Jun. 3, 2003 now abandoned, which claims the benefit of U.S. Provisional Application No. 60/402,817, filed Aug. 12, 2002.

FEDERALLY SPONSORED RESEARCH

Not Applicable

SEQUENCE LISTING OR PROGRAM

Not Applicable

BACKGROUND OF THE INVENTION

1. Field of the Invention

The present invention relates to the automatic measurement of visually perceptible attributes of a person or a group of people within the range of sensors and combining this information with the transaction records that are generated by the person or people executing a transaction in a retail store.

2. Background of the Invention

Retailers and consumer goods companies are constantly looking for new ways to improve their retail performance. Companies spend millions of dollars each year in an effort to understand the buying habits of their customers. Until now, businesses have had to rely on spot surveys and ineffective frequent buyer programs to try to segment the customers based on various attributes and understand their behaviors in their establishment.

One of the crucial attributes dictating customer behavior is their demographic profile. There is a very strong relationship between the demographic profile of the customers—gender, age, and ethnicity—and their shopping habits—what they buy. Each demographic group engages with products in the stores differently and therefore retailers and consumer goods companies must develop targeted strategies to reach and convert specific segments. On top of that, the shopping behavior also changes when the customers shop in groups, such as family members or friends. If this kind of data can be collected, it can be further analyzed to provide crucial information to retailers or marketers.

Since the purchase data—time, location, and items—of the customers are registered through electronic cash registers, the missing piece of information is the demographic profile of the customers. Customer loyalty programs, such as frequent shopper club cards and customer panel data, have been widely used to collect shopper demographics data. The data collected from loyalty programs—household data—is useful for analytics because it helps analysts link multiple transactions to the same loyalty card. This helps them analyze the repetitive purchasing behavior of the card users. Customers are expected to provide information regarding their demographics, income, household, etc. when they apply for a card. These details are used by the analysts to group the transaction data for different customer segments. Although the insights gathered from such analyses are extremely valuable, they also suffer from major drawbacks. Since customers are expected to actively participate in the data collection process, the household data has multiple biases. The household data is limited to the customers who use the loyalty card at the checkout; it does not include the customers who do not participate in the programs or who forgot to carry their cards. Often the demographics information provided at the time of registration is outdated, inaccurate, or incomplete, making it highly unreliable. Finally, the loyalty card data does not provide highly valuable information such as who is the primary shopper in the household, when customers shop alone and when they shop as a group, etc.

It is one of the main goals of the present invention to augment the depth and accuracy of existing data by addressing the shortcoming of household data by measuring the demographics information and the shopping group information without relying on any intrusive (such as interview), inefficient (passive human observation), or inconvenient/incomplete (customer loyalty card) means. The proposed method utilizes video cameras installed at the checkout counters to measure the demographics information and group information of the checkout customers. The method is also capable of measuring the checkout purchase behavior—whether items such as candy or magazines have been picked up at the checkout shelves, which is impossible to deal with using customer loyalty programs.

The present invention utilizes one or more video cameras to recognize the demographic profiles as well as the group information of the shoppers. At least one camera captures the video of facial images of the customers waiting at the checkout queue, and tracks the facial images individually to determine the demographic classes of each person. The same video can be analyzed to determine the group information—whether some of the customers in the queue are family members or friends shopping together. Further facial expression analysis of the people in the group can also determine which person is the "leader" (who takes the role of interacting with the cashier and makes the payment) of the group and estimate the shoppers' overall emotional response during the transaction. An optional top-down camera can also be installed and utilized to infer more accurate group information and to identify potential checkout purchases.

U.S. Pat. No. 5,369,571 of Metts disclosed a method and apparatus for obtaining demographic information at the point of sale. In the disclosed prior art, the sales clerk had to input an assessment concerning certain demographic information about the customer to generate the demographic data, using a bar code scanner, a keypad with keys, or buttons. However, this increases the sales clerk's labor load, and the extra activities delay the overall processes at the point of sale, which could be costly from the business point of view of the particular business facility. Furthermore, the assessment could vary depending on the personal viewpoints of the sales clerks, thus making the accumulated demographic data from different sales clerks over a period of time unreliable. These problems in the prior art require an automatic and efficient approach for gathering the demographic information from the customers.

More recently, there have been attempts to track customers in a retail setting. For example, in Ismail Haritaoglu, Myron Flickner, "Detection and Tracking of Shopping Groups in Stores," cvpr, vol. 1, pp. 431, 2001 IEEE Computer Society Conference on Computer Vision and Pattern Recognition (CVPR'01)—Volume 1, 2001, (hereinafter Haritaoglu 1), Haritaoglu 1 describes a technique for tracking groups of people as they move through the store.

Computer vision algorithms have been shown to be an effective means for detecting people. For example, in Ismail Haritaoglu, Myron Flickner, "Attentive Billboards," iciap, pp.

0162, 11th International Conference on Image Analysis and Processing (ICIAP'01), 2001, (hereinafter Haritaoglu 2), Haritaoglu 2 describes a method for detecting people and determining how long those people looked at a billboard. Also, in U.S. Pat. Appl. Pub. No. 20020076100 of Luo Jiebo (hereinafter Luo), the author describes a method for detecting human figures in a digital image.

Other computer vision techniques have been shown to be able to extract relevant demographic features of people in an image. For example, in Moghaddam, Baback and Yang, Ming-Hsuan, "Gender Classification with Support Vector Machines", 2000 Proc. of Int'l Conf. on Automatic Face and Gesture Recognition, the authors describe a technique using Support Vector Machines (SVM) for classifying a face image as a male or female person. In the U.S. Pat. No. 5,781,650 of Lobo, et al. (hereinafter Lobo), the authors describe a method for discerning the age of a person in an image. In Lyons, Michael J. et al, "Automatic Classification of Single Facial Images", 1999 IEEE Transactions on Pattern Analysis and Machine Intelligence, vol. 21, no. 12, pp. 1357-1362, the authors describe a method for discerning the ethnicity (or race) of a person in an image. Finally, in U.S. Pat. No. 6,188,777 of Darrell, et al. (hereinafter Darrell), Darrell describes a means to extract a person's height, skin color, and clothing color from an image of a person. The combination of computer vision techniques such as the ones mentioned above allows for the possibility of connecting the visual information from a scene with a timestamp and a location marker to derive rich behavioral characteristics of the people in the scene.

Combining these extracted features with transaction data records will provide a better understanding of the types of people who are transacting. Until now many ideas have been put forth in an attempt to understand the characteristics of the people who are actually transacting. For example, in the U.S. Pat. Appl. Pub. No. 20020052881 of Player, Zen (hereinafter Player), Player describes a method for collecting the demographics of people while they are playing a game on the Internet. In U.S. Pat. No. 6,070,147 of Harms, et al. (hereinafter Harms), Harms describes a customer loyalty program using a government issued identification card, like a driver's license. In U.S. Pat. Nos. 5,974,396, 6,298,348, 6,424,949 and 6,430,539, consumer profiling is performed based on a consumer's past shopping history. These techniques give rise to the privacy question, and/or they fall short when the consumer does not remember their loyalty card. U.S. Pat. No. 6,285,983 of Jenkins attempts to address the privacy issue while still marketing to the consumer based on their profile. U.S. Pat. Nos. 6,393,471, 6,408,278, 6,338,044, 5,983,069, 6,129,274, and U.S. Pat. Appl. Pub. Nos 20020035560 and 20010004733 all discuss the delivery of customized content and/or advertisements based on consumer profiles.

SUMMARY

This present invention provides a method and framework for extracting consumers' demographic, behavior, and group information using computer vision algorithms and combining this information with the transaction records generated by the consumers' transaction.

By setting up the visual sensing devices to include the transaction terminal in which the consumer will interact, a demographic feature vector can be constructed from the consumer at the transaction terminal. The demographic feature vector is also augmented with a timestamp and a location marker. This timestamp and location marker can be used to join the demographic feature vector with the transaction record that is generated when the consumer transacts. This combined data record is then stored for future analysis.

For example, before this invention, a store could analyze the transaction records and determine which products selling best and which products do not sell well. With this invention, the store can now analyze which products are moving best in a given demographic segment (e.g., men ages 25-35) and which products are not selling well in a given demographic segment. The invention augments the existing segmentation used to retailers by providing a more accurate measurement of demographics parameters (age, gender, ethnicity), and also by providing new segmentation parameters such as shopping groups, behavioral segmentation such as wait time or service time at the checkout counter, emotional state, and interaction with front-lane-merchandising (FLM). Key differentiators of this invention compared to any other method to collect the same data include: (1) one-to-one association between transaction and shopper data, (2) massive sample sizes enabled by automated data collection, and (3) an unobtrusive data collection system eliminating various biases in the data.

The components of the system are the following: visual sensing device(s) (VSD), demographic feature extractor (DFE), data integrator (DI), and the data repository (DR).

Examples of a VSD comprise a monocular camera, a stereo camera, or an infrared camera. However, this invention is not limited to the exemplary visual sensing devices.

The DFE is composed of implementations of computer vision algorithms that extract the desired features of the people in the scene. Examples of desired features may include, but are not limited to, the following: gender, age, race, height, skin color, hair color, time in the field-of-view, time looking at a display or an advertisement, etc. To facilitate an understanding of the invention, the particular features that will be included in the description are gender, age, race, and time in the field-of-view (FOV). However, the invention is not limited to these features. Rather, the invention is a framework for combining the visually extractable features with a timestamp and a location marker in order to form a time- and location-sensitive feature vector. The accumulation of these feature vectors provides a data set that required either written surveys or manual spot observations to generate, prior to this invention.

In more general aspects, the VSD senses the people in its field-of-view. The digital images are then sent to the DFE for processing. For each person in an image, the DFE forms a feature vector that includes, but is not limited to, the following items: the time the image was captured and the location of the VSD. The location of the VSD is stored when the VSD is installed. The gender, age, race, and the time in the field-of-view of each person are extracted from the image sequence. The feature vector is then joined with the transaction record that was generated by the consumer transaction. The result is stored in the data repository (DR).

It is one of the objectives of the first step of the processing to detect faces from face view, track them individually, and estimate poses of each of the tracked faces to normalize these images so that they have standard position, size, and orientation. This step also provides the coordinates of the tracked faces, along with the timestamps and the durations of the appearance of the faces.

It is one of the objectives of the second step of the processing to determine the demographic categories of the face. Each pose-normalized face is fed to the demographics recognition module to classify the face into demographic categories, such as gender, age, and ethnicity. This step generates a demographics feature vector for each face.

It is one of the objectives of the third step of the processing to detect and track customers from the top-down view, and estimate the position of the body. Motion-based foreground segmentation may be used as an initial step. The body detection step can utilize appearance-based learning.

It is one of the objectives of the fourth step of the processing to analyze the dynamic behavior of the tracked customers so that their shopping group membership—such as family, friends, etc.—and checkout behavior—such as interactions with products on checkout shelves or interactions with the cashier—can be recognized. This step generates the identified group information and the recognized checkout behavior information.

It is one of the objectives of the fifth step of the processing to associate the instances of faces in face view and the instances of customers in top-down view, so that the demographics data and the group data belonging to the same person can be matched and combined.

It is one of the objectives of the fifth step of the processing to associate the transaction data and the demographics/group/checkout behavior data to generate the associated data. Exemplary data collected by the invention comprises: (1) data for shopping groups, such as the number of members in the group, (2) shopping behavior of the group as a unit and by individual member, and (3) transaction identifier, such as checkout counter id.

A wide variety of analytics is possible by using the shopper data collected by this invention. The first step in the analysis is associating the shopper data with the transaction. The transaction identifiers help make exact association between the shopper data and transaction data. The transaction data might be further associated to household data, depending on whether the shopping unit participates in the loyalty program. This helps associate the shopper data with household data.

The combined data set provides a rich source of insights. The shopper data helps analysts get a much more accurate understanding of the loyalty card household—number of household members, household ethnicity, life stage (such as gen x, gen y, baby boomers, young family, etc.); these analytics help retailers get a clear picture of how shoppers shop at their stores and how the shopper composition changes with geography, time-of-day, day-of-week, etc.

Further, each attribute in the shopper data can be directly used as a segmentation variable to group the transaction data and analyze the purchasing behavior of different types of shoppers. The insights gathered will be highly valuable as the shopper data will help add more detail into trip type segmentation done by retailers. The analysis will help statistically prove or disprove qualitative insights, such as shopping groups that have children tend to spend more in the store, or shoppers usually shop alone when they are on quick trips, etc.

The shopper data will also help retailers effectively measure the performance of their FLM strategies. Primary factors that impact FLM purchases are FLM stock keeping units (SKU) assortment, layout, time spent by the shoppers at the checkout, and checkout type (self-service, assisted). FLM is a highly profitable store area for retailers, as it encourages impulse purchases of high margin items such as candy, magazines, instant consumption drinks and food, etc. But retailers don't have any scalable means of collecting shopper insights. Transaction analysis is not effective in this case because FLM is usually a secondary location for most stock keeping units (SKU) present there. Therefore, the analysts cannot differentiate purchases made from FLM from those made from primary category locations. The current invention offers two ways of identifying and analyzing FLM purchases. The shopper data includes details of whether or not shoppers interacted with the FLM. The shoppers who interacted with the FLM can be grouped and the analysts can further drill into their transaction data to identify whether they purchased one of the SKUs in FLM. This process helps indirectly link shopper purchase behavior with different FLM strategies. Alternatively, the invention can also identify the exact products picked up by the shoppers from FLM by visually identifying shoppers picking up products from FLM and matching the products with their SKUs.

The shopper data also helps analyze the customer service at the checkout counter. The changes in emotional stage of the shoppers at the checkout counter will help analysts measure the level of service provided by customer service representatives at the counter. If the shoppers smile and engage with the representative, then they most likely had a positive shopping experience. Whereas, if they found it difficult to navigate and shop the store, if they had to wait for a long time to get serviced, or if the representative was not cooperative, they will have negative emotional change on their face.

DRAWINGS

Figures

Figure 3A:
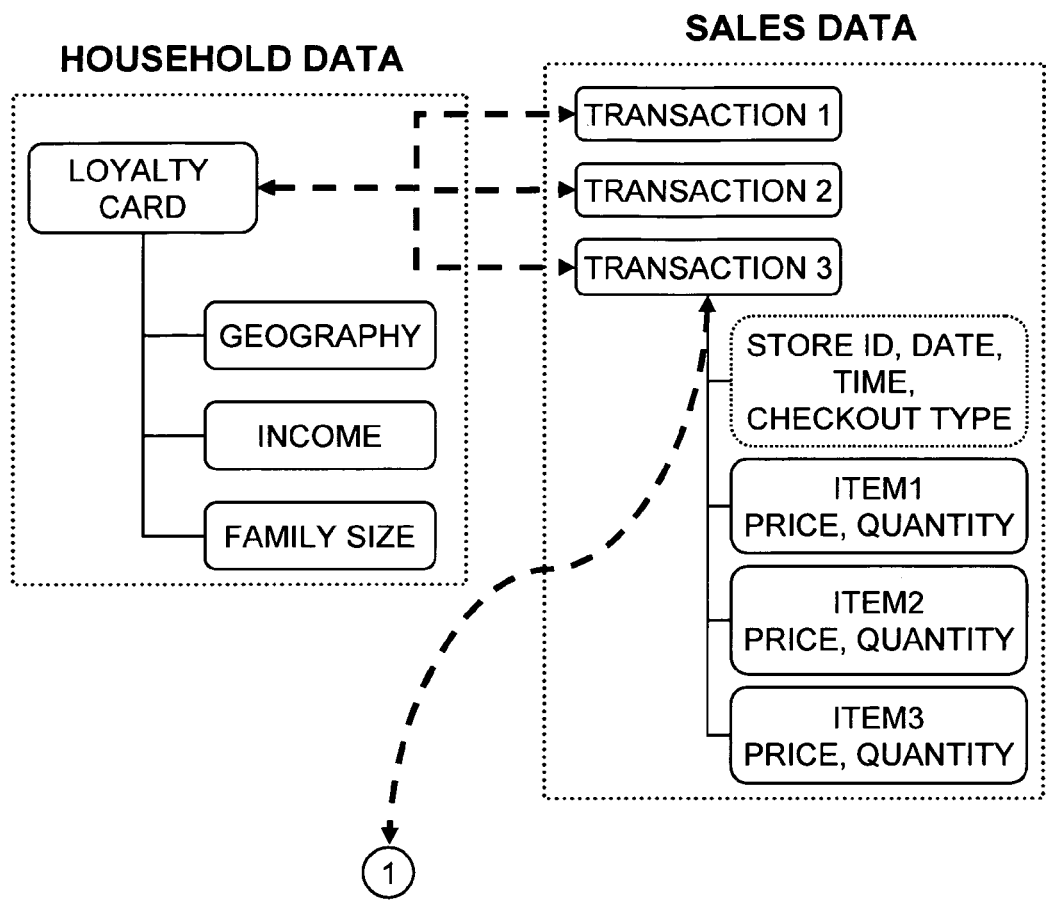

FIG. 3A describes the first part of an exemplary data structure generated by the invention, and association among various data sources.

Figure 3B:
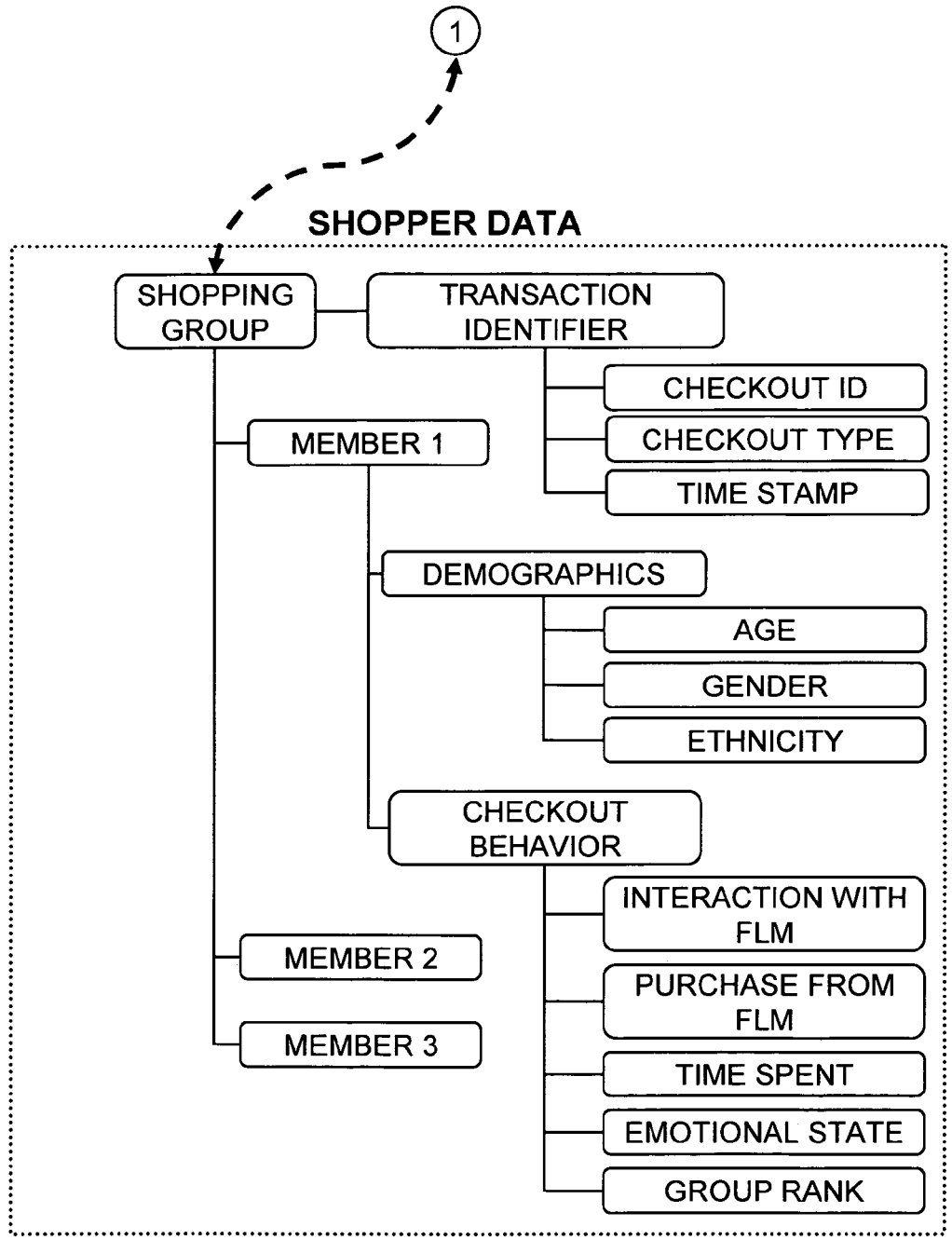

FIG. 3B describes the second part of an exemplary data structure generated by the invention, and association among various data sources.

Figure 4:
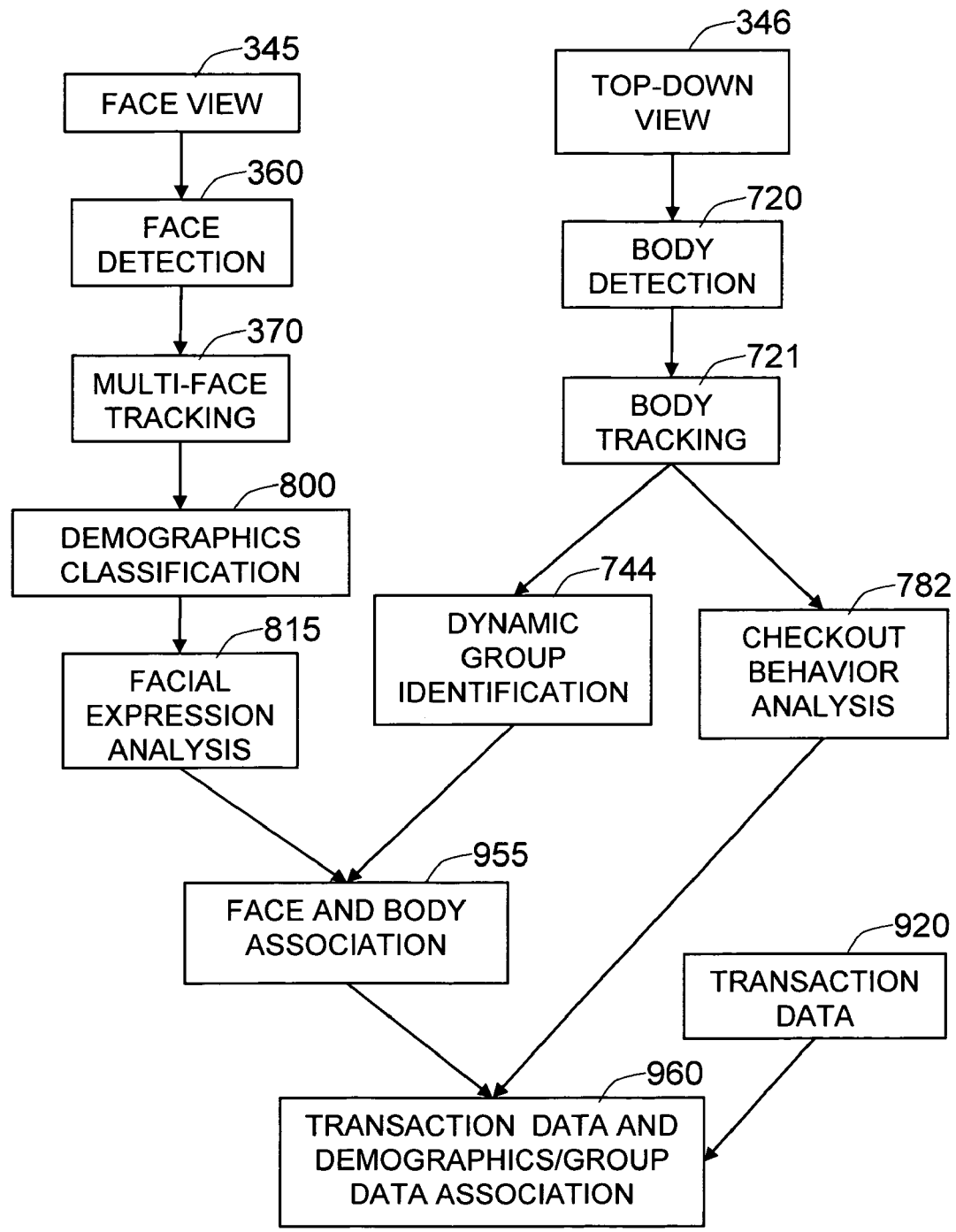

FIG. 4 shows an overall scheme of the invention in an exemplary embodiment.

Figure 5:
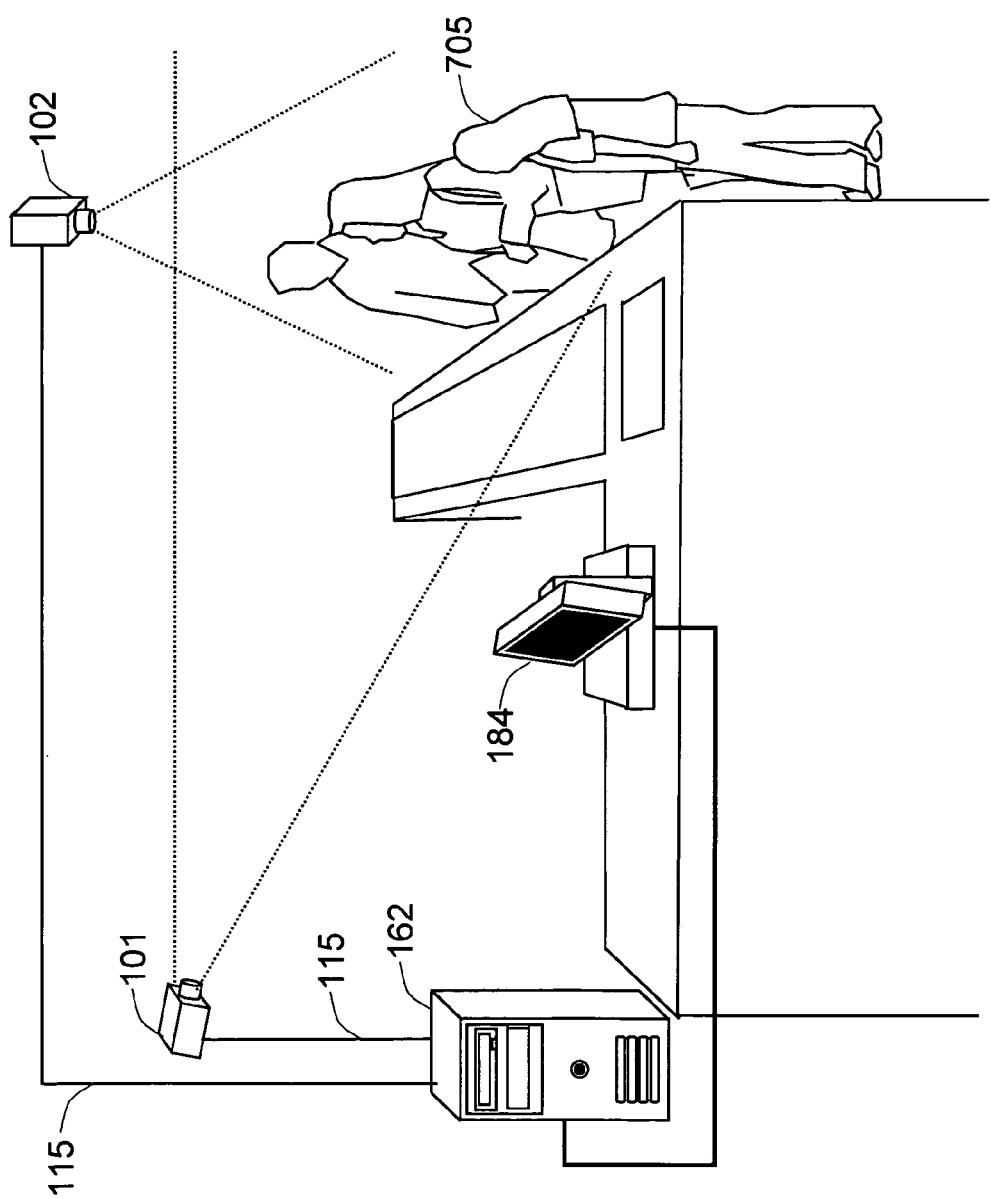

FIG. 5 shows a view of the system of the invention in an operational environment in an exemplary embodiment.

Figure 6:
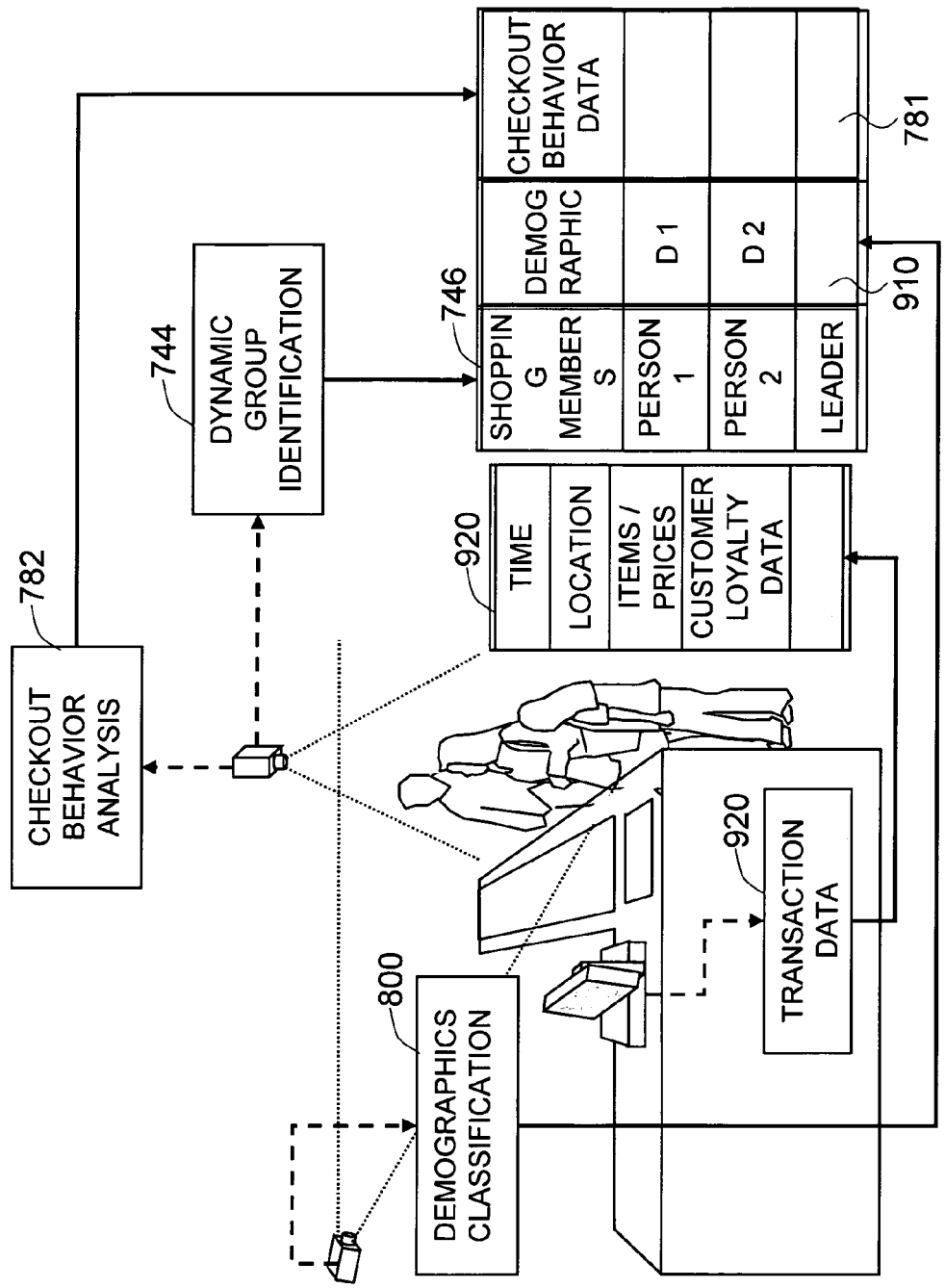

FIG. 6 shows a data generation and processing scheme of the system in an exemplary embodiment of the present invention.

Figure 7:
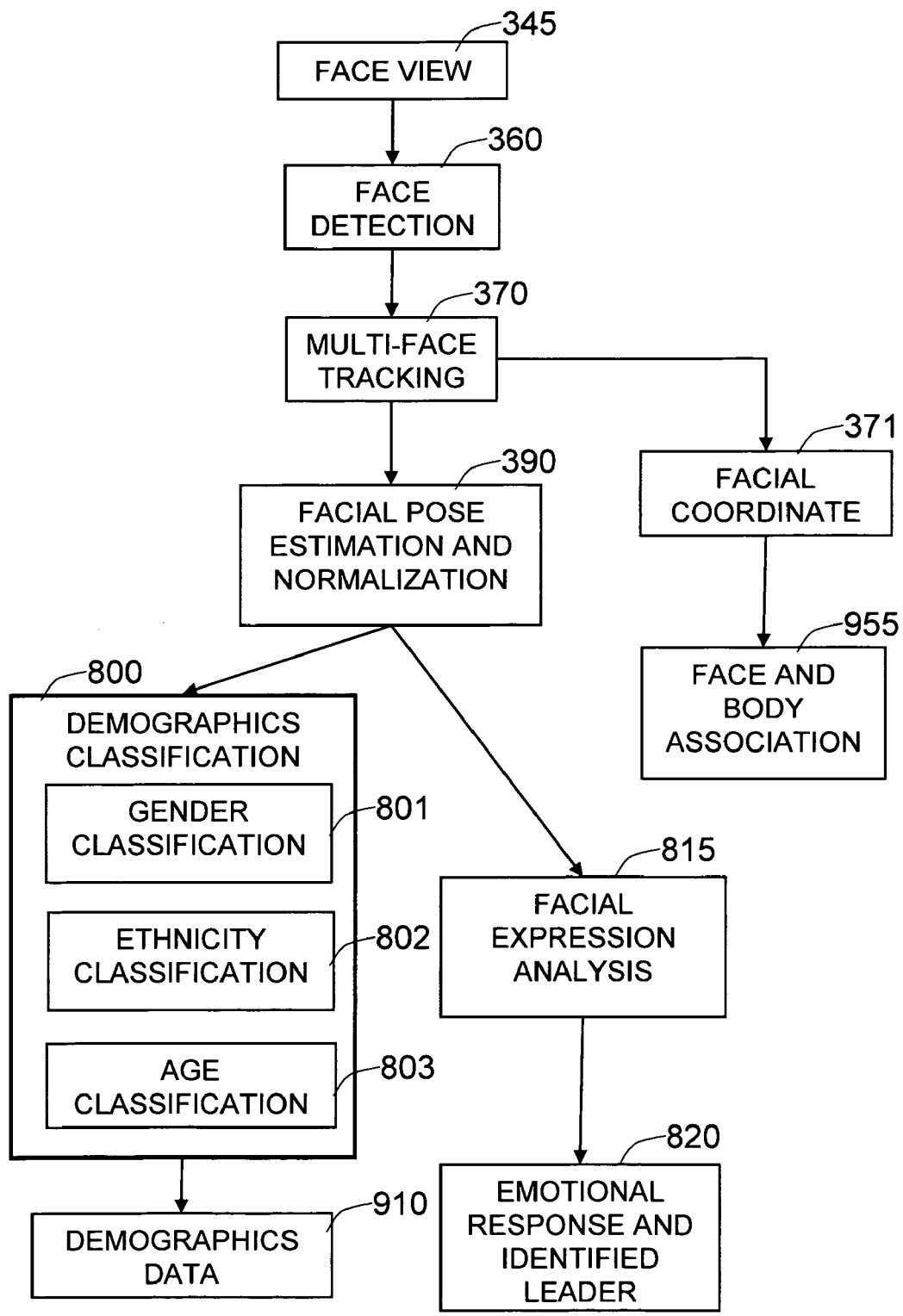

FIG. 7 shows an exemplary embodiment of the face view processing.

Figure 8:
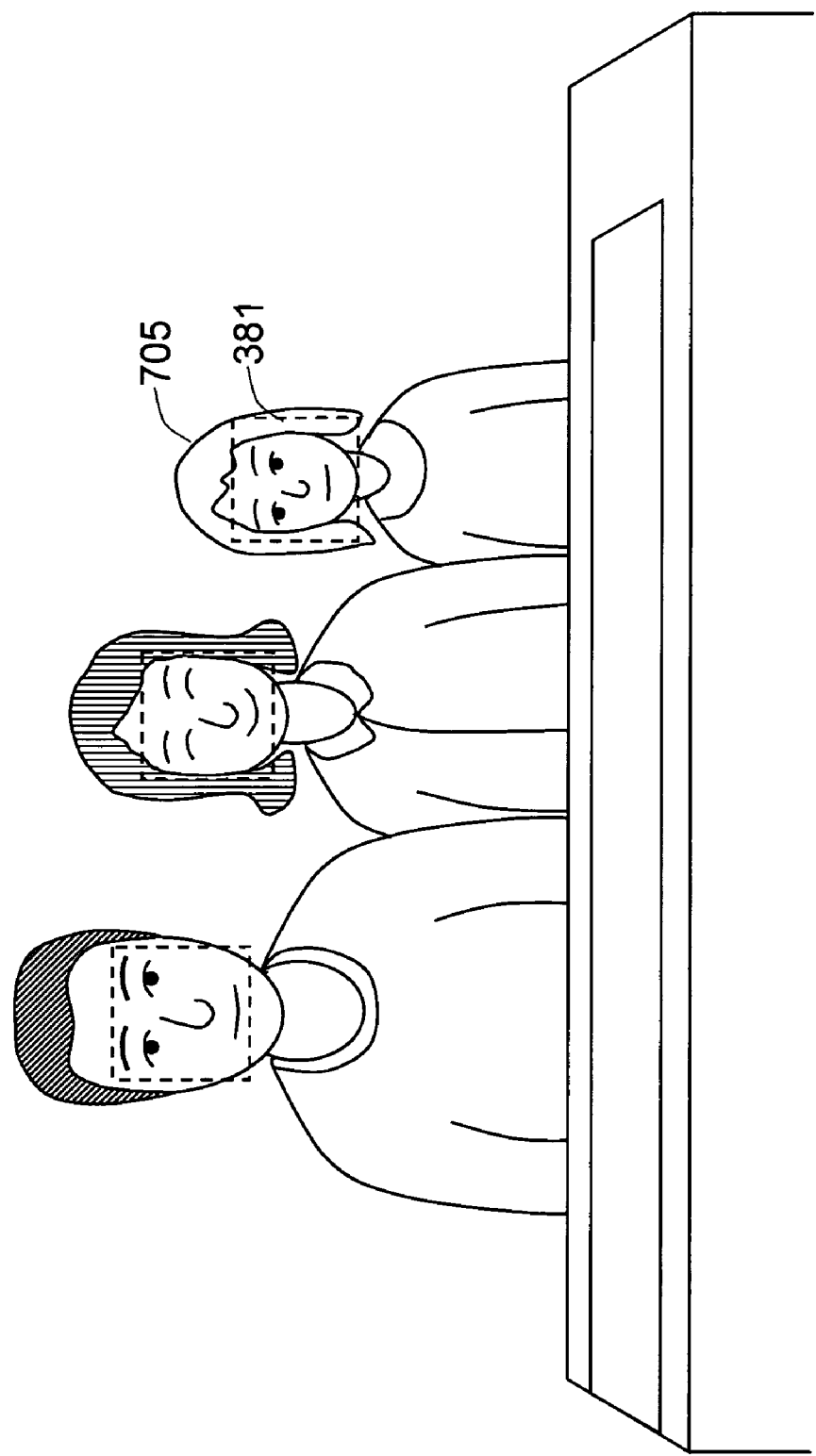

FIG. 8 shows an exemplary embodiment of the face view, where a group of people stand in front of the cash register to pay for the purchased items.

Figure 9:
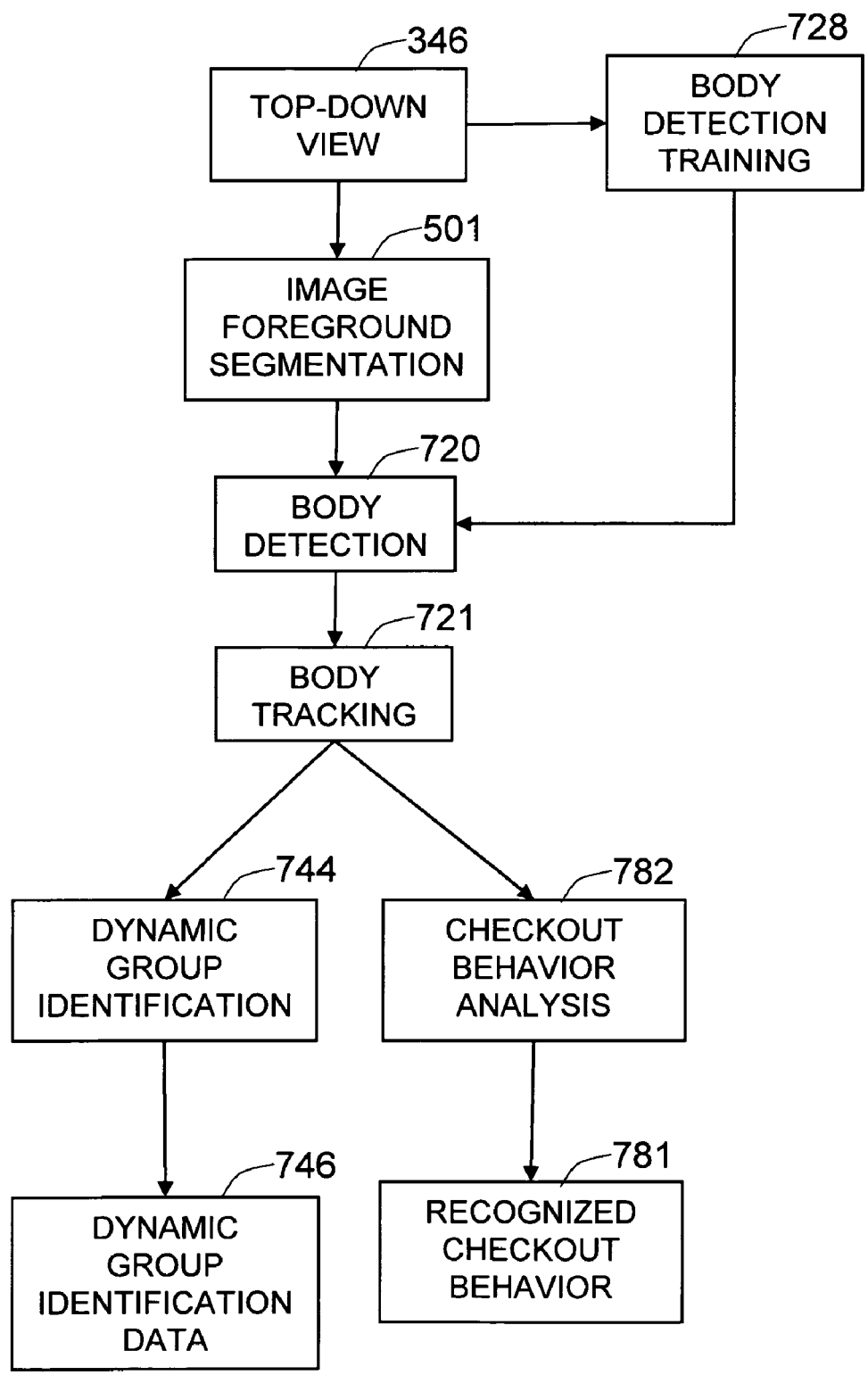

FIG. 9 shows an exemplary embodiment of the top-down view processing.

Figure 10:
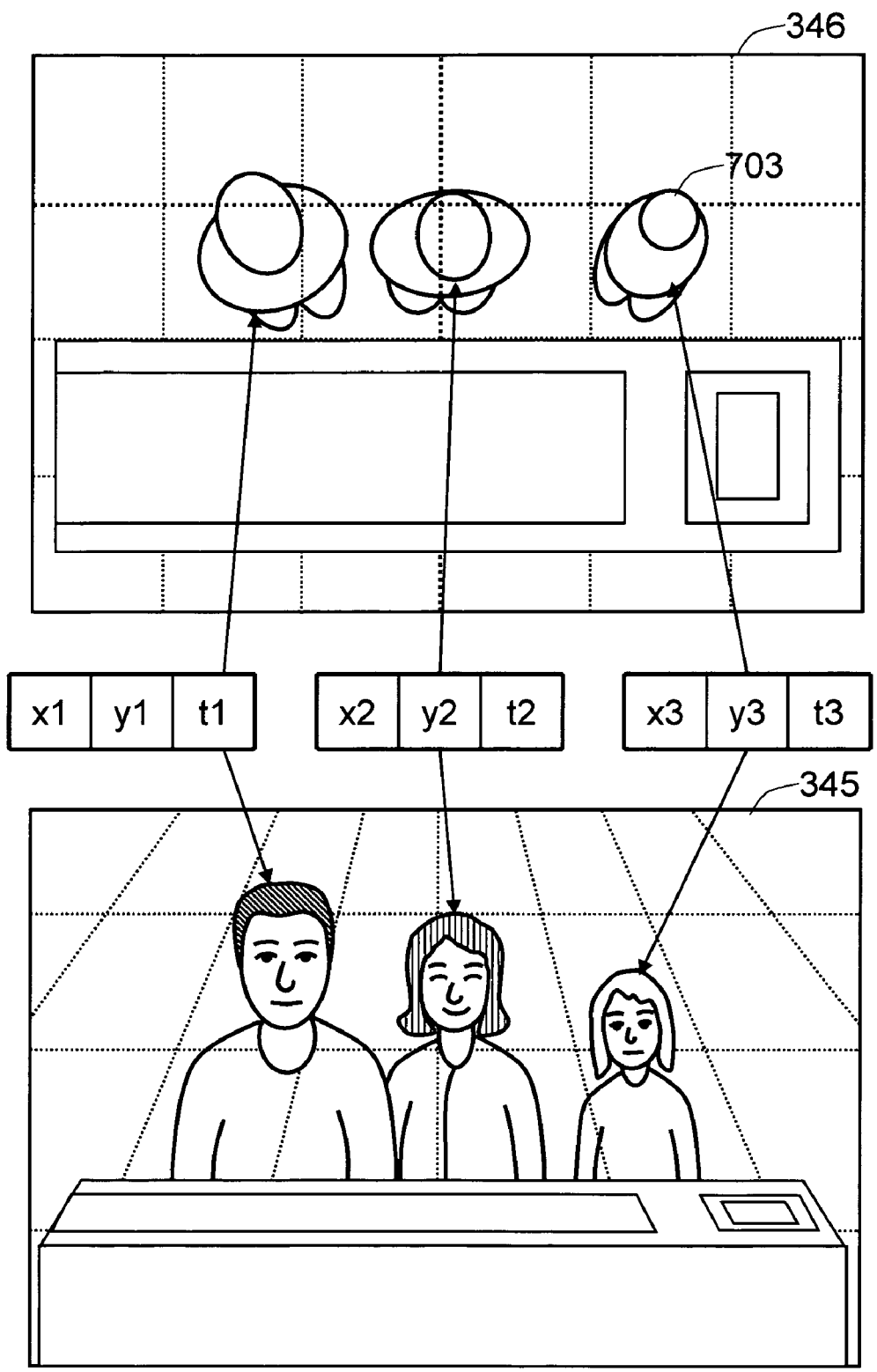

FIG. 10 shows an exemplary embodiment of the face and body association step.

Figure 11:
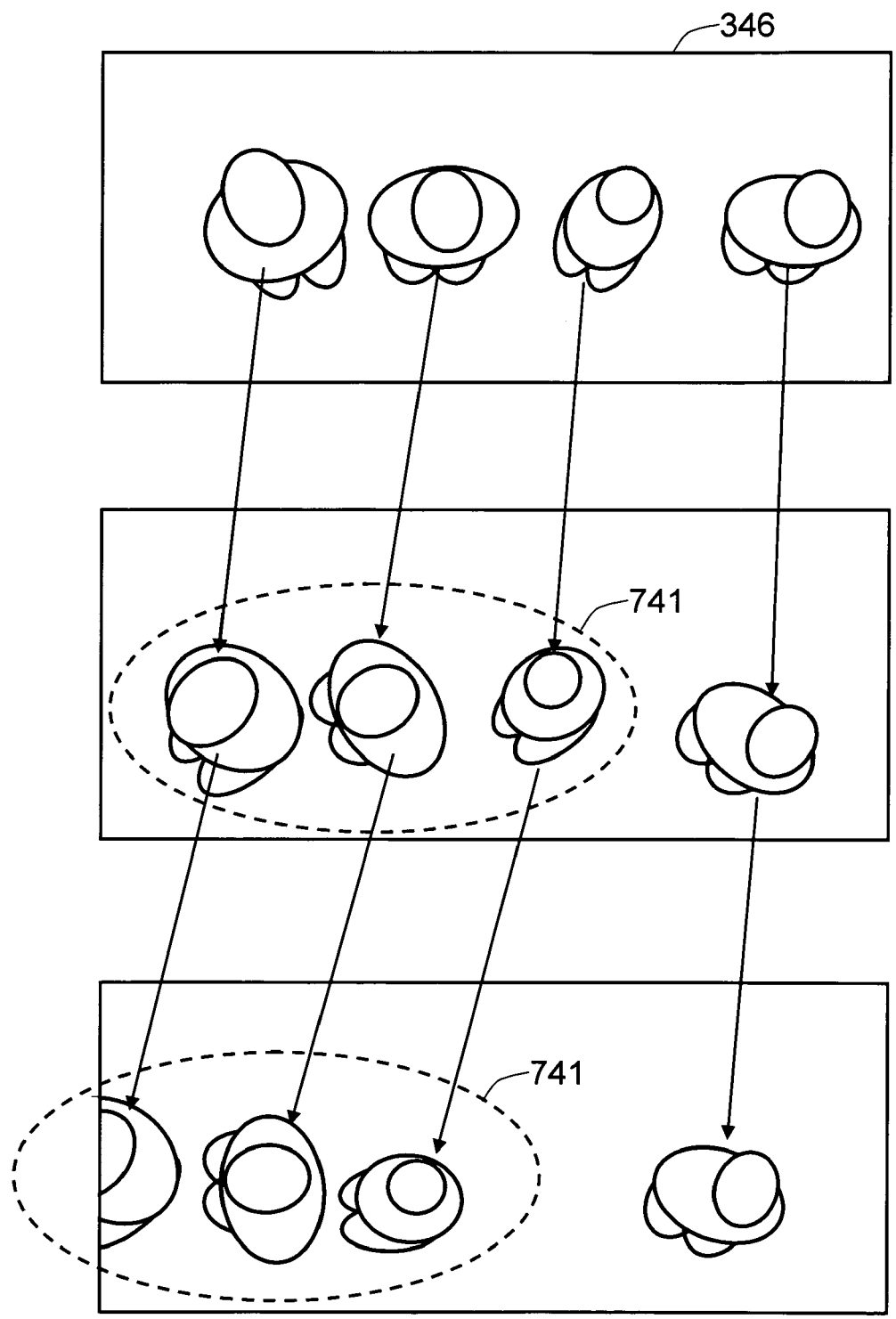

FIG. 11 shows and exemplary embodiment of the dynamic group identification step.

Figure 12:
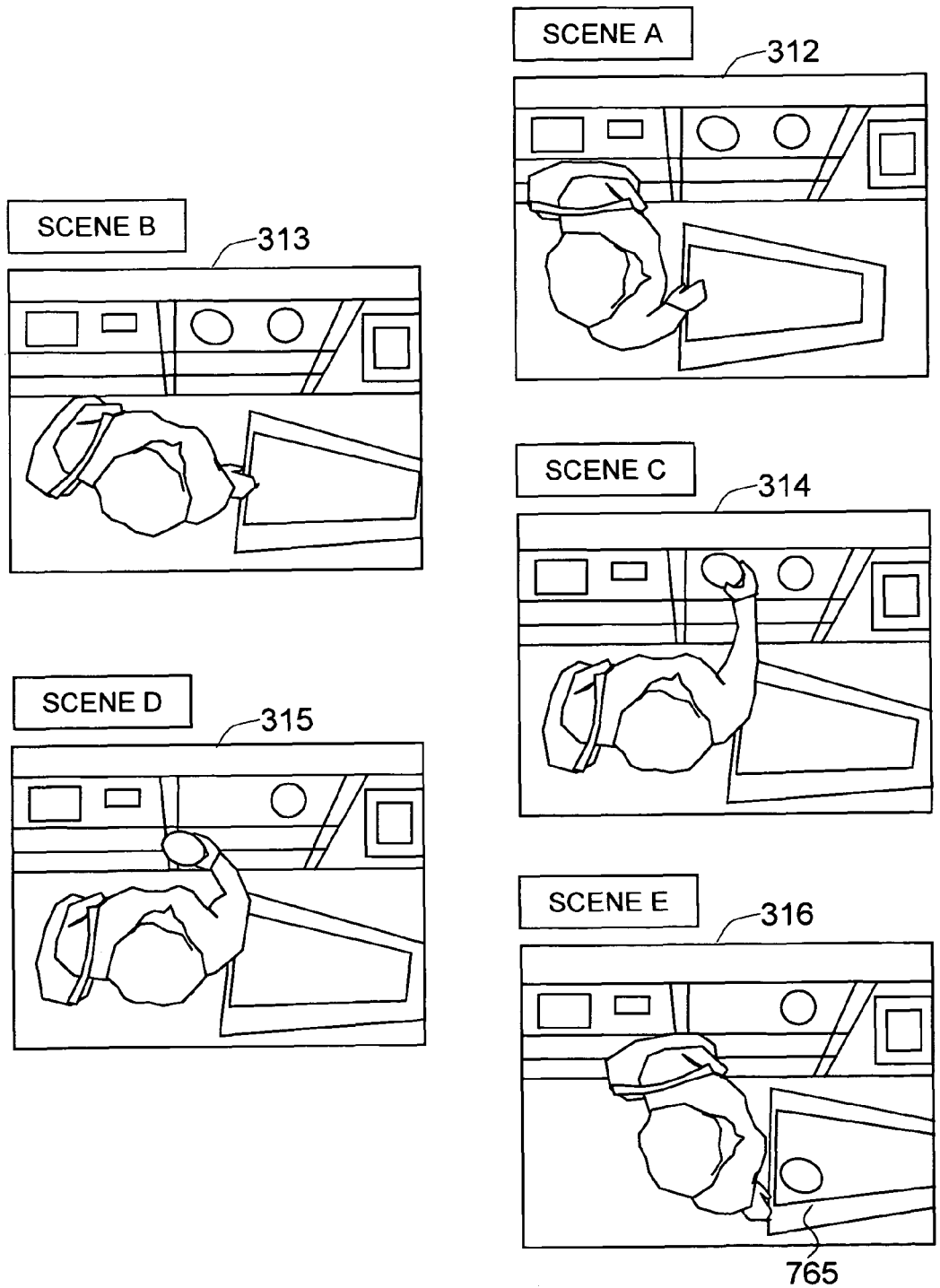

FIG. 12 shows the process of checkout behavior recognition, in an exemplary embodiment of the present invention.

Figure 13:
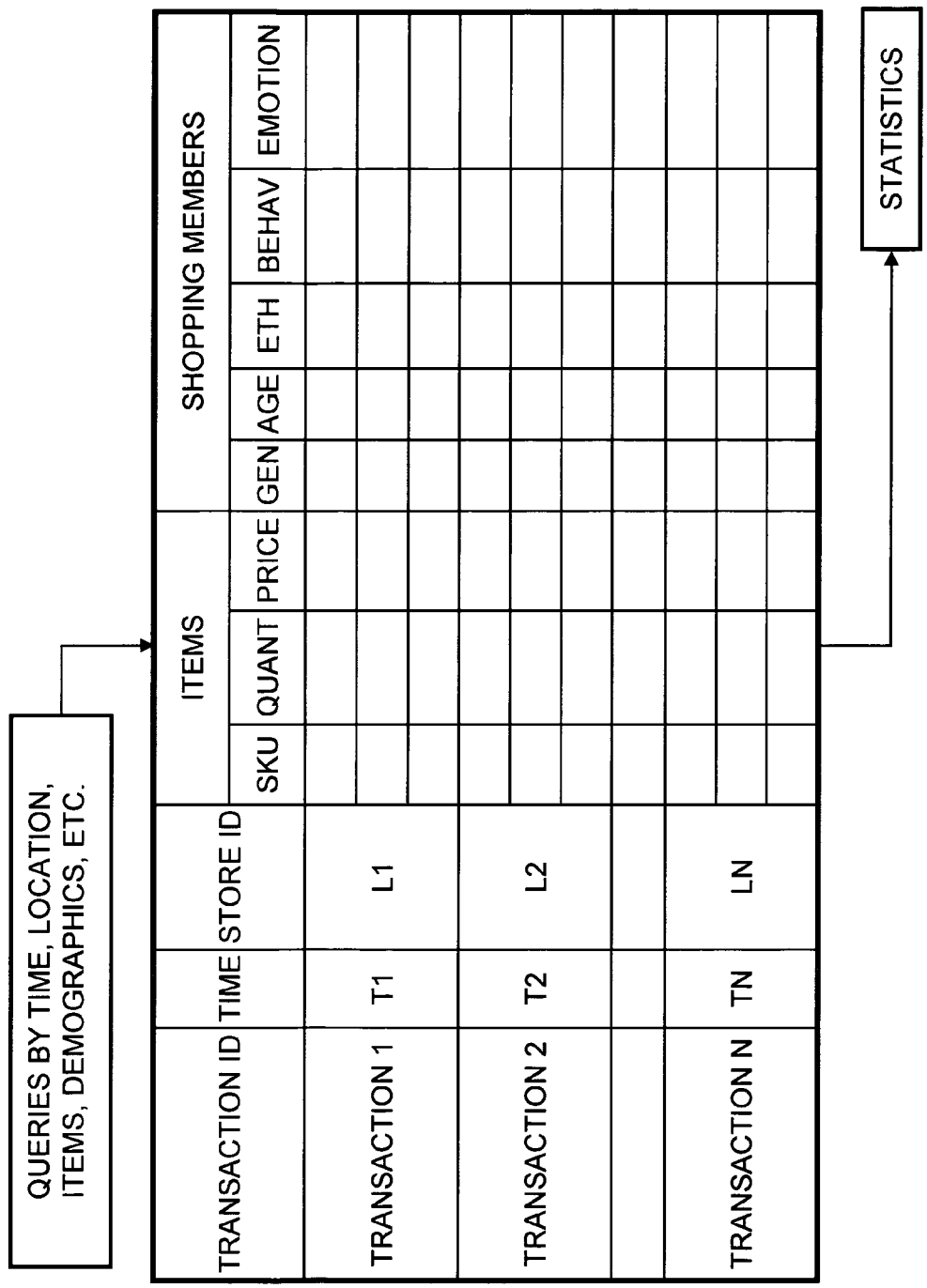

FIG. 13 shows an exemplary application of the present invention.

FIG. 14 shows a table for an exemplary transaction and loyalty data that can be associated with the demographics data and behavior analysis in the present invention.

DETAILED DESCRIPTION OF THE INVENTION

The present invention provides a method and framework for extracting a consumer's demographic, behavior, and group information using computer vision algorithms and combining this information with the transaction records generated by the consumer transaction.

Figure 1:
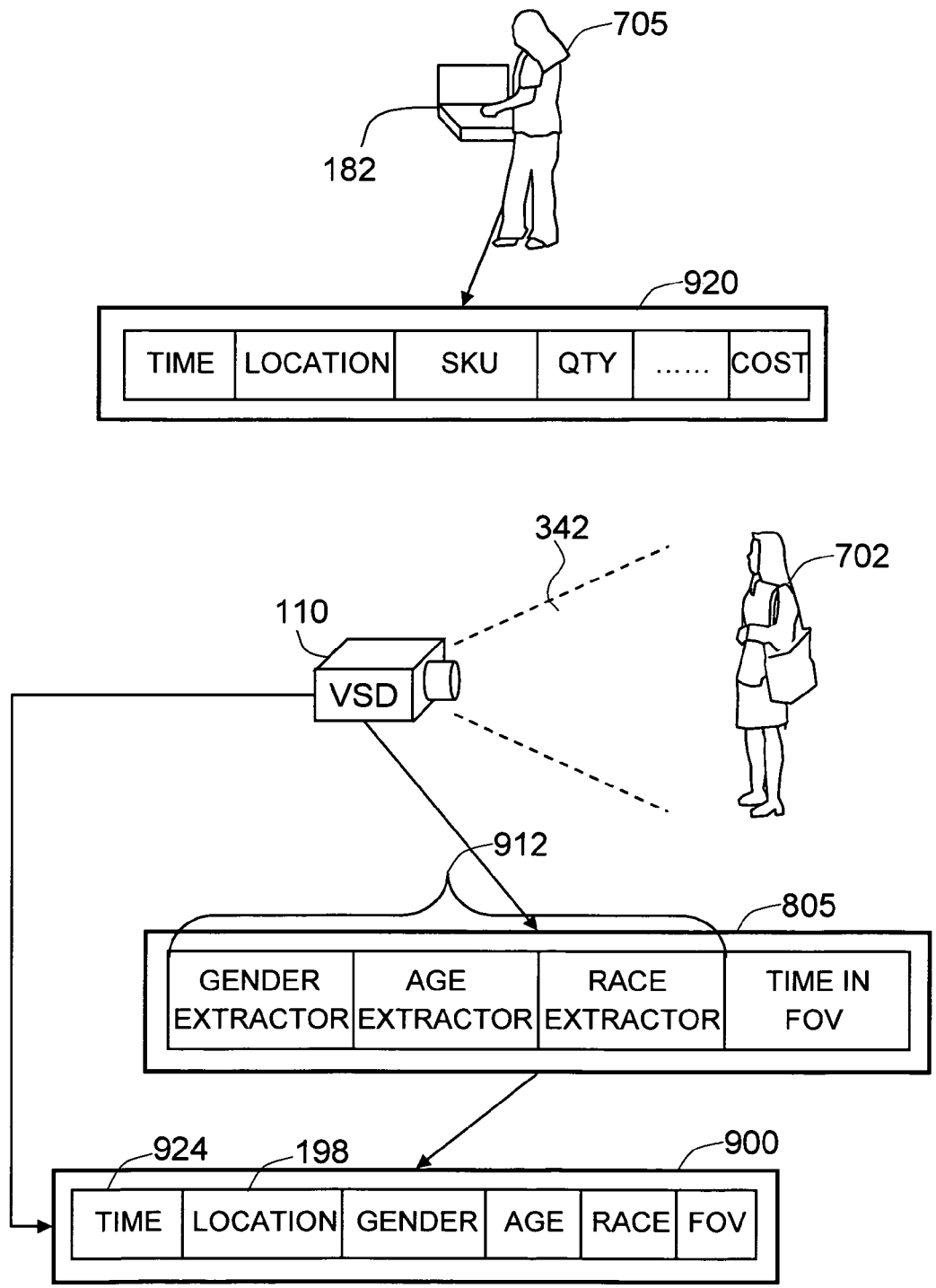
FIG. 1 is a diagram of an example embodiment in which demographic features and transaction data are extracted.

FIG. 1 shows an exemplary system overview of the present invention. The figure shows a cashier 705 registering a transaction using a transaction device 182. The transaction device 182, such as a cash register terminal, generates a transaction data 920. For purposes of illustration, the transaction contains the time that the transaction took place, the location where the transaction took place, the SKU number of the item purchased, the quantity purchased, and the cost of the item.

In the bottom portion of the figure, a customer 702 enters the field-of-view (FOV) 342. The visual sensing device (VSD) 110, such as a video camera, captures the face views 345 of the person in the FOV and sends them to the demographic feature extractor (DFE) 805. At the same time, the VSD 110 enters the timestamp 924 of when the customer 702 entered the FOV 342 into the feature vector 900. The VSD 110 enters the location 198 of the VSD 110 into the feature vector 900.

For illustration purposes, the DFE 805 in FIG. 1 contains a gender extractor component, an age extractor component, a race extractor component, and a time in FOV component. The DFE 805 can contain any implementation of a computer vision algorithm that extracts features pertaining to people in the FOV 342.

The timestamp of the first frame when the face image was detected is then subtracted from the timestamp of the last frame when the face image appeared, resulting in the time that the person was in the FOV. The results of each of the components of the DFE 805 are then inserted into the feature vector 900.

In this exemplary embodiment, the VSD 110 can be a firewire camera, a USB camera, or an IP camera. A personal computer system may be used as the control and processing system 162 in the exemplary embodiment. The processing software may be written in a high level programming language, such as C++, and a compiler such as the Gnu g++ may be used for the compilation in the exemplary embodiment.

The VSD 110 is mounted in such a way that the cashier 705 and the transaction terminal 184 are in view. As the customer 702 checks out, the demographic features are extracted and the demographic feature vector 912 is constructed. Also, the transaction data 920 are generated. The transaction data 920 and the demographic feature vectors 912 are combined by the data integrator (DI) 952 in the next step.

Figure 2:
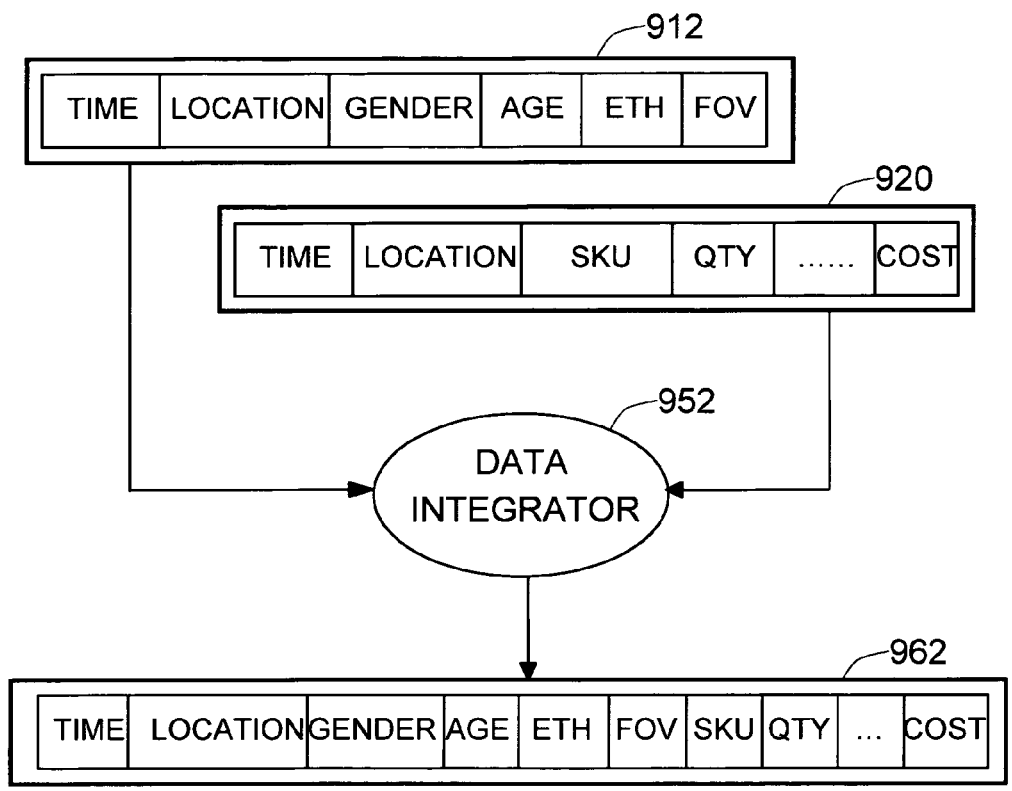
FIG. 2 is a diagram of an example embodiment showing how a transaction record and demographic record are joined.

FIG. 2 illustrates how the demographic feature vector 912 and the transaction data 920 are integrated. The data integrator (DI) 952 combines the demographic feature vector 912 and the transaction data 920 by joining the two records using the time and location attributes as join criteria. The result is an associated data 962. The associated data 962 is then stored in the data repository for future analysis.

Examples of possible queries to the associated data 962 follow:

Show the top five products purchased by men between the ages of 25-40.

Show the top five products purchased by women between the ages of 50-65 in the month of June.

Show the average dollar amount of a purchase by women between the ages of 18-35.

FIG. 3A describes the first part of an exemplary data structure generated by the invention and association among various data sources. FIG. 3B describes the second part of an exemplary data structure generated by the invention, and association among various data sources.

The transaction data is generated when the products in the shopper's basket are scanned at the checkout counter. Each transaction has details of each item purchased by the shopper (price, quantity) along with identification details such as transaction id, timestamp, checkout id, etc. If the shopper uses a loyalty card then the truncation may also have loyalty card id.

The household data comes from loyalty card data bases of panel databases. The loyalty card database has various details associated with each unique loyalty card id, such as household type, family size, income level, address, etc. Alternatively, some companies pay shoppers to collect and mail their transaction slips, which are then digitized and collected in the database, called panel data, along with household information similar to the loyalty database. Each loyalty card id may have one or more transactions associated with it, but every transaction may not have a loyalty card id.

The present invention collects shopper data at the checkout counter while the products in the basket are being scanned at the checkout. The shopper data is associated with transaction data using transaction identifiers such as checkout id and timestamp. For the checkout counters enabled with VSD, each transaction will have one shopper dataset associated with it. For transactions from VSD-enabled checkout counters that have loyalty card id, the shopper data can be associated with household data.

Key fields collected in the shopper dataset are shown below. Exemplary data collected by the invention comprises:

(1) Transaction identifier
   a. Checkout counter id
   b. Checkout counter type
   c. Timestamp (2) Shopping groups
   a. Shopper group member 1
      i. Demographics
         1. Age (less than 18, between 18 and 35, between 35 and 55, and greater than 55)
         2. Gender (male, female)
         3. Ethnicity (Caucasian, African-American, Hispanic, Asian)
      ii. Checkout behavior
         1. Group leader (dominant group member) flag
         2. Time spent at the checkout counter
         3. Checkout counter experience (emotional state while at the checkout counter)
         4. Interaction with front-lane merchandising (FLM)
         5. Products picked up from FLM
   b. Shopper group member 2
      i. Demographics
         . . .
      ii. Checkout behavior
         . . .
   c. Shopper group member 3
      i. Demographics
         . . .
      ii. Checkout behavior
         . . .
   n. Shopper group member n
      i. Demographics
         . . .
      ii. Checkout behavior
         . . .

As shown in (2) a. through (2) n., the exemplary data, i.e. demographics data and checkout behavior data, are collected for every member of the "n" number of members in the shopper group.

FIG. 4 shows an overall scheme of the invention in an exemplary embodiment. The face view 345 from the face view camera 112 captures the facial images of the customers waiting in the checkout queue. The face detection 360 step then detects any human faces in the view, and the multi-face tracking 370 step individually tracks them so that the identities of individuals can be maintained. The face detection 360 step typically employs a machine learning-based detection algorithm that relies on training on a large number of facial or non-facial images to locate facial images. The demographics classification 800 step recognizes the demographic classes to which the given face belongs, including gender, age, and ethnicity; the facial expression analysis 815 step also further analyzes the facial expressions of the customers to identify the shopping group leader and assess the overall emotional response of the customers.

On the other hand, the top-down view camera 111 captures the top-down view 346 of the checkout queue. The body detection 720 step identifies each region of the image that belongs to a person, and the body tracking 721 step tracks the movement of individual people. These steps may rely on one of the traditional motion foreground determination algorithms and traditional image region tracking algorithms. The dynamic behaviors of the tracked bodies reveal the group information in the dynamic group identification 744 step. For example, when a number of people who stay together in a queue walk out of the queue at the same time after a transaction is complete, it is safe to assume that they belong to the same group. The top-down view 346, along with the tracked body positions can also be further analyzed to recognize checkout behavior (such as checkout product interaction, purchase, or interaction with the cashier) in the checkout behavior analysis 782 step.

To be able to associate the demographics information with an identified individual or group, it is necessary to make correspondences between the body images in the top-down view 346 and the facial images in the face view 345. The face and body association 955 step handles the issue, based on the match between the spatial coordinate of the face view 345 and the spatial coordinate of the top-down view 346.

Finally, the correspondence between the transaction data 920 obtained from the transaction device and the demographics/group information are made based on the temporal matches between the transactions and the video events, in the transaction data and demographics/group data association 960 step.

FIG. 5 shows a view of the system of the invention in an operational environment in an exemplary embodiment. The first means for capturing images 101 is placed behind the cash register, so that the facial images of the customers in the queue can be captured. A face view camera 112 is an exemplary embodiment of the first means for capturing images 101. The second means for capturing images 102 is placed at a different position. A top-down view camera 111 is an exemplary embodiment of the second means for capturing images 102, so as to capture the top-down view 347 of the body image of the customers. The video feeds from both the first means for capturing images 101 and the second means for capturing images 102 are connected to the control and processing system 162 via means for video interface 115, and are processed by the control and processing system 162. The video feed from the first means for capturing images 101 is processed by the control and processing system to classify demographic profiles of the customers' faces. The video feed from the second means for capturing images 102 is processed to track the customers 705.

The transaction terminal 184 records the POS transaction of the customers and sends it to the control and processing system 162, so that the POS data and the customer demographics and group information can be associated.

FIG. 6 shows a data generation and processing scheme of the system in an exemplary embodiment of the present invention. Whenever a POS transaction has completed, the transaction terminal generates the transaction data 920—the time and the location (store ID and register ID) of the transaction, the purchased items along with prices, and the optional customer loyalty data. The processing of the face camera view includes demographics classification 800 that generates the demographics classification data 910—gender, age, and ethnicity of each person in the shopping group who were involved with the transaction. The processing of the top-down camera view—dynamic group identification 744 and checkout behavior analysis 782—generates the dynamic group identification data 746 and the checkout behavior data 781 of the same shopping group. The combined data from these four sources constitutes the associated transaction and demographics/group data 964.

FIG. 7 shows an exemplary embodiment of the face view processing. From the face view 345, the face detection 360 step finds human faces. The multi-face tracking 370 step tracks the detected faces, so that they preserve their individual identities. The step provides the facial coordinate 371 of each of the tracked faces, so that the face and body association 955 step can make correspondences between the tracked faces and the tracked bodies (from the top-down view).

For further facial image processing, the facial pose estimation and normalization 390 step processes each tracked facial image to estimate its two-dimensional and three-dimensional pose, and normalize the facial image according to the estimated pose. The normalized facial image is fed to the demographics classification 800 step, where the gender classification 801, ethnicity classification 802, and age estimation 803 steps extract the demographic data 910 of the face in the form of the demographics feature vector 912. These classification steps typically utilize machine learning-based algorithms to classify images.

On the other hand, the normalized facial image is further analyzed by the facial expression analysis 815 step to draw the person's emotional response and identify whether the person is the leader of the shopping group, based on the estimated facial pose and the facial expression.

FIG. 8 shows an exemplary embodiment of the face view, where a group of people stand in front of the cash register to pay for the purchased items. The dashed squares represent the outlines of the tracked faces 381 of the customers 705. The tracked faces 381 are further analyzed to derive demographics information of the customers, and also to determine their emotional responses and identify the group leader.

FIG. 9 shows an exemplary embodiment of the top-down view processing. The images from the top-down view 346 are utilized in the body detection training 728 step to train a machine learning-based body detection module off-line. In an exemplary operation, the top-down view 346 image first goes through the image foreground segmentation 501 step to find candidate areas in the image where the movement of human bodies resulted in the motion foreground. The trained body detection 720 module then utilizes the trained learning machine to find human bodies in the detected motion foreground region. The body tracking 721 step tracks the detected bodies individually, so that their identities can be correctly maintained. The tracked body images are fed to the dynamic group identification 744 step, where the body images are further analyzed to determine whether some of the tracked people belong to a shopping group, such as a family. In an exemplary embodiment, the step investigates whether some of the customers in the top-down view leave together after a cash register transaction. This kind of behavior constitutes one of the typical shopping group behaviors; such instance confirms the inferred dynamic group identification data 746.

On the other hand, the tracked body images are also handed over to the checkout behavior analysis 782, where the interaction of some of the shoppers with the products on the checkout shelves or with the cashier is recognized as checkout behavior data 781.

FIG. 10 shows an exemplary embodiment of the face and body association 955 step. From the top-down view 346, the bodies of the customers 703 are detected and tracked, so that their positions at each instance can be estimated. From the face view, the faces of the customers are detected and tracked, so that their positions can be estimated. Because the top-down view camera and the face view camera are placed and oriented so that the two views sufficiently overlap, most of the customers' bodies and faces appear to both views. Both of these views can be calibrated so that the image positions of the views can be translated into a common world-coordinate system. The common world-coordinates (x, y) and the timestamps t of the faces and bodies provide reliable matches between them.

FIG. 11 shows an exemplary embodiment of the dynamic group identification 744 step. In the top figure, the body images of four customers waiting in the checkout queue are shown from the top-down view 346. While they are standing and waiting for the transactions to be completed, it is often not easy to determine whether some of the customers belong to the same shopping group. In the middle figure, the three customers on the left started to walk away from the queue after their transaction has been completed. In the bottom figure, it becomes much clearer that these three people belong to the same shopping group 741, because they leave the queue at the same time. The person on the right doesn't join the group and stays in the queue; it is highly likely that this person does not belong to the group. The timing of the group's departure and the timestamps of the transaction provide the match between the shopping group 741 and the transaction data 920.

FIG. 12 shows the process of checkout behavior recognition 784, in an exemplary embodiment of the present invention. In scene A 312, the shopper is waiting in the checkout queue without showing any interest in the items on the checkout shelf. The shopper is close enough to the shelf; but based on the body orientation of the shopper, the shopper is not engaged with products. In scene B 313, both the proximity information and the body orientation information can correctly detect a shopper engagement with products on the shelves. In scene C 314, an occurrence of the shopper reaching out her arm toward the shelf can be detected from the foreground object analysis that is focused on the space between the shopper and the shelf; in effect, the shopper interaction is detected. In scene D 315, an occurrence of a shopper interaction with a product—more specifically, an instance of picking up a product—is detected based on the foreground object analysis that is focused on the shelf space close to the shopper. In scene E 316, an occurrence of product purchase is detected based on the foreground object analysis focused on both the shelf space close to the shopper and the shopping cart 765 that belongs to the shopper.

FIG. 13 shows an exemplary application of the present invention. A preferred embodiment of this invention is a system that using computer vision algorithms, extracts demographic features of people at a transaction device, and integrates the transaction data generated by the transaction device with the extracted demographic features. Further, it is the accumulation and aggregation of these features into a data set that allows for statistical analysis, data mining and/or querying for the purpose of discovering behavior patterns of groups of people and trends of the sensed people.

In an exemplary embodiment, a data set can be generated by the following queries based on a digitized interval (e.g., hour, day, week, month, or year) of the collected timestamp. The following is an exemplary list of queries using a digitized interval of the timestamp:
   a) Show the number of people per hour
      i) Broken down by Gender
      ii) Broken down by Age Groups
      iii) Broken down by Ethnicity Groups
      iv) Broken down by Gender and Age Groups
      v) Broken down by Gender and Ethnicity Groups
      vi) Broken down by Age Groups and Ethnicity Groups
      vii) Broken down by Gender, Age Groups, and Ethnicity Groups
   b) Show the time people spent in the field-of-view per hour
      i) Broken down by Gender
      ii) Broken down by Age Groups
      iii) Broken down by Ethnicity Groups
      iv) Broken down by Gender and Age Groups
      v) Broken down by Gender and Ethnicity Groups
      vi) Broken down by Age Groups and Ethnicity Groups
      vii) Broken down by Gender, Age Groups, and Ethnicity Groups In an exemplary embodiment, a data set can be generated by the following queries based on the actual location marker or an aggregate of the location. The location marker can be a marker that represents the actual address of the store in question. Aggregation can occur based on such things as zip code, city, state, region, and/or country. The following is an exemplary list of queries using the location marker:
   a) Show the number of people per store location
      i) Broken down by Gender
      ii) Broken down by Age Groups
      iii) Broken down by Ethnicity Groups
      iv) Broken down by Gender and Age Groups
      v) Broken down by Gender and Ethnicity Groups
      vi) Broken down by Age Groups and Ethnicity Groups
      vii) Broken down by Gender, Age Groups, and Ethnicity Groups
   d) Show the time people spent in the field-of-view per store location
      i) Broken down by Gender
      ii) Broken down by Age Groups
      iii) Broken down by Ethnicity Groups
      iv) Broken down by Gender and Age Groups
      v) Broken down by Gender and Ethnicity Groups
      vi) Broken down by Age Groups and Ethnicity Groups
      vii) Broken down by Gender, Age Groups, and Ethnicity Groups In an exemplary embodiment, a data set can be generated by the following queries based on the features represented in the transaction records (e.g., SKU, quantity, or price) or the aggregation of the features represented in the transaction records. The following is an exemplary list of queries using as a point of illustration price, quantity, and SKU:
   a) Show the number of items purchased per day per store location
      i) Broken down by Gender
      ii) Broken down by Age Groups
      iii) Broken down by Ethnicity Groups
      iv) Broken down by Gender and Age Groups
      v) Broken down by Gender and Ethnicity Groups
      vi) Broken down by Age Groups and Ethnicity Groups
      vii) Broken down by Gender, Age Groups, and Ethnicity Groups b) Show the money spent per purchase per day per store location
   i) Broken down by Gender
   ii) Broken down by Age Groups
   iii) Broken down by Ethnicity Groups
   iv) Broken down by Gender and Age Groups
   v) Broken down by Gender and Ethnicity Groups
   vi) Broken down by Age Groups and Ethnicity Groups
   vii) Broken down by Gender, Age Groups, and Ethnicity Groups
c) Show the top 5 items purchased per day per store location
   i) Broken down by Gender
   ii) Broken down by Age Groups
   iii) Broken down by Ethnicity Groups
   iv) Broken down by Gender and Age Groups
   v) Broken down by Gender and Ethnicity Groups
   vi) Broken down by Age Groups and Ethnicity Groups
   vii) Broken down by Gender, Age Groups, and Ethnicity Groups
d) Show the number of checkout items purchased per day per store location
   i) Broken down by Gender
   ii) Broken down by Age Groups
   iii) Broken down by Ethnicity Groups
   iv) Broken down by Gender and Age Groups
   v) Broken down by Gender and Ethnicity Groups
   vi) Broken down by Age Groups and Ethnicity Groups
   vii) Broken down by Gender, Age Groups, and Ethnicity Groups FIG. 14 shows a table 921 for an exemplary transaction and loyalty data that can be associated with the demographics data and behavior analysis in the present invention. The spatiotemporal information such as date, time, and lane number in the exemplary table can provide the information to link a transaction with the corresponding shopper data, which includes demographics data and behavior data. The member ID number can also allow classification of the transaction by lifestyle group.

In an exemplary embodiment, the associated data can also be utilized to analyze the performance difference among different types of checkout environments. The checkout environment can be identified by the checkout id, lane number, or VSD id. For example, the associated data can show which type of checkout between a self-checkout and a traditional cashier serviced checkout performed better in terms of a specific group of products, such as products at the front-lane, for a particular demographic group, using the information based on the association of the transaction data and shopper data. The attributes for measuring the performance of checkouts can also comprise average checkout time and average number of people in the waiting queue, in addition to sales data of products in the checkouts. The performance data can be further analyzed according to the demographic group.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for combining automatically detected demographic, group, and behavior features of people in a retail transaction area with transaction data, comprising the following steps of:

a) acquiring facial images of the people from first input images captured by at least a first means for capturing images, including a visual sensing device, b) determining demographic categories of the facial images to generate a demographic data, using at least a demographic feature extractor, c) acquiring person images from second input images captured by at least a second means for capturing images, including a visual sensing device, near the transaction area, d) determining shopping group membership of the people to generate group data from the second input images, e) analyzing the movement of the people for behavior analysis by determining checkout behaviors of the people based on analysis of the second input images by recognizing interactions of the people with merchandise in the transaction area, f) associating transaction data with the demographics data, the behavior analysis, and the group data, and wherein the analysis of the second input images comprises body orientation estimation of the people, proximity calculation between the people and checkout shelves, and foreground object analysis, in the transaction area, wherein the first means for capturing images comprises a face view camera that captures the facial images of the people waiting in the checkout queue for face detection, wherein the second means for capturing images comprises a top-down view camera that captures the top-down view and person images of the checkout queue for person detection, wherein the face view camera and the top-down view camera are placed and oriented so that the image positions of the facial images and the person images are translated into a common world-coordinate system, and wherein the steps are performed in a control and processing system that is connected to the means for capturing images.

2. The method according to claim 1,
wherein the method further comprises a step of detecting and tracking the person by using at least a learning machine to find person images,
wherein the learning machine is trained to find human bodies in a motion foreground region in the second input images.

3. The method according to claim 1,
wherein the method further comprises a step of automatically identifying shopping group information of the people based on their movements,
wherein body images of the people are tracked, and
wherein the tracked body images are analyzed to determine whether one or more of the tracked people belong to the shopping group in the top-down view.

4. The method according to claim 1,
wherein the method further comprises a step of determining a leader of the shopping group by analyzing facial expressions of the people in the transaction area,
wherein the leader is a person who takes the role of interacting with the cashier and makes the payment, and
wherein the facial image analysis to determine the leader includes the estimation of facial pose and facial expression that represents the degree of attention and emotion of the person.

5. The method according to claim 1, wherein the method further comprises a step of determining emotional responses of the people to the shopping experience by analyzing the facial expressions of the people in the transaction area.

6. The method according to claim 1, wherein the method further comprises a step of associating the facial images and the person images by comparing image coordinates and timestamps of the facial images and image coordinates and timestamps of the person images.

7. The method according to claim 1, wherein the method further comprises a step of associating the transaction data with the demographics data, the behavior data, and the group data based on the timestamps recorded from the transaction terminal and the timestamps recorded from the facial image acquisitions and the person image acquisitions.

8. The method according to claim 1,
wherein the method further comprises a step of associating the loyalty card data, transaction data, and shopper data,
wherein the shopper data is measured based on automatic video analytics for visual images of shoppers without any interruption, and
wherein the shopper data is calculated using the facial images from the first means for capturing images and the person images from the second means for capturing images in the checkout queue.

9. The method according to claim 1,
wherein the method further comprises a step of analyzing the performance difference among different types of checkout environments,
wherein the types of checkout environments comprise a self-checkout and a cashier serviced checkout, and
wherein the performance comprises sales data of products, average checkout time, and average number of people in the waiting queue per a particular demographic group, based on the demographic category determination from the facial images and analysis of the movement of the people from the person images.

10. An apparatus for combining automatically detected demographic, group, and behavior features of people in a retail transaction area with transaction data, comprising:
a) means for acquiring facial images of the people from first input images captured by at least a first means for capturing images, including a visual sensing device,
b) means for determining demographic categories of the facial images to generate a demographic data, wherein the means for determining demographic categories includes at least a demographic feature extractor,
c) means for acquiring person images from second input images captured by at least a second means for capturing images, including a visual sensing device, near the transaction area,
d) means for determining shopping group membership of the people to generate group data from the second input images,
e) means for analyzing the movement of the people for behavior analysis by determining checkout behaviors of the people based on analysis of the second input images by recognizing interactions of the people with merchandise in the transaction area, and
f) means for associating transaction data with the demographics data, the behavior analysis, and the group data,
wherein the analysis of the second input images comprises body orientation estimation of the people, proximity calculation between the people and checkout shelves, and foreground object analysis, in the transaction area,
wherein the first means for capturing images comprises a face view camera that captures the facial images of the people waiting in the checkout queue for face detection,
wherein the second means for capturing images comprises a top-down view camera that captures the top-down view and person images of the checkout queue for person detection,
wherein the face view camera and the top-down view camera are placed and oriented so that the image positions of the facial images and the person images are translated into a common world-coordinate system, and
wherein the apparatus further comprises a control and processing system that is connected to the means for capturing images.

11. The apparatus according to claim 10,
wherein the apparatus further comprises means for detecting and tracking the person by using at least a learning machine to find person images,
wherein the learning machine is trained to find human bodies in a motion foreground region in the second input images.

12. The apparatus according to claim 10,
wherein the apparatus further comprises means for automatically identifying shopping group information of the people based on their movements,
wherein body images of the people are tracked, and
wherein the tracked body images are analyzed to determine whether one or more of the tracked people belong to the shopping group in the top-down view.

13. The apparatus according to claim 10,
wherein the apparatus further comprises means for determining a leader of the shopping group by analyzing facial expressions of the people in the transaction area,
wherein the leader is a person who takes the role of interacting with the cashier and makes the payment, and
wherein the facial image analysis to determine the leader includes the estimation of facial pose and facial expression that represents the degree of attention and emotion of the person.

14. The apparatus according to claim 10, wherein the apparatus further comprises means for determining emotional responses of the people to the shopping experience by analyzing the facial expressions of the people in the transaction area.

15. The apparatus according to claim 10, wherein the apparatus further comprises means for associating the facial images and the person images by comparing image coordinates and timestamps of the facial images and image coordinates and timestamps of the person images.

16. The apparatus according to claim 10, wherein the apparatus further comprises means for associating the transaction data with the demographics data, the behavior data, and the group data based on the timestamps recorded from the transaction terminal and the timestamps recorded from the facial image acquisitions and the person image acquisitions.

17. The apparatus according to claim 10,
wherein the apparatus further comprises means for associating the loyalty card data, transaction data, and shopper data,
wherein the shopper data is measured based on automatic video analytics for visual images of shoppers without any interruption, and
wherein the shopper data is calculated using the facial images from the first means for capturing images and the person images from the second means for capturing images in the checkout queue.

18. The apparatus according to claim 10,
wherein the apparatus further comprises means for analyzing the performance difference among different types of checkout environments, wherein the types of checkout environments comprise a self-checkout and a cashier serviced checkout, and wherein the performance comprises sales data of products, average checkout time, and average number of people in the waiting queue per a particular demographic group, based on the demographic category determination from the facial images and analysis of the movement of the people from the person images.

\* \* \* \* \*